US010246590B2

United States Patent
Kaplan et al.

(10) Patent No.: US 10,246,590 B2
(45) Date of Patent: *Apr. 2, 2019

(54) USE OF INDIGO DERIVATIVES FOR DYEING SYNTHETIC TEXTILES, NOVEL INDIGO DERIVATIVES AND PROCESS FOR DYEING SYNTHETIC TEXTILES

(71) Applicant: Sanko Tekstil Isletmeleri San. Ve Tic. A.S., Inegol-Bursa (TR)

(72) Inventors: Gokhan Kaplan, Inegol-Bursa (TR); Ozgur Akdemir, Inegol-Bursa (TR); Olcay Bayar, Inegol-Bursa (TR); Aybige Akdag, Inegol-Bursa (TR); Ozgur Cobanoglu, Inegol-Bursa (TR)

(73) Assignee: Sanko Tekstil Isletmeleri San. Ve Tic. A.S., Inegol-Bursa (TR)

( * ) Notice: Subject to any disclaimer, the term of this patent is extended or adjusted under 35 U.S.C. 154(b) by 13 days.

This patent is subject to a terminal disclaimer.

(21) Appl. No.: 15/622,205

(22) Filed: Jun. 14, 2017

(65) Prior Publication Data

US 2017/0362435 A1 Dec. 21, 2017

(30) Foreign Application Priority Data

Jun. 17, 2016 (EP) .................................... 16174973
Oct. 24, 2016 (EP) .................................... 16195293

(51) Int. Cl.
| | | |
|---|---|---|
| *A61Q 5/10* | (2006.01) | |
| *C09B 7/02* | (2006.01) | |
| *D06P 1/22* | (2006.01) | |
| *D06P 3/52* | (2006.01) | |
| *D06P 5/20* | (2006.01) | |

(Continued)

(52) U.S. Cl.
CPC ................ *C09B 7/02* (2013.01); *D06P 1/228* (2013.01); *D06P 3/042* (2013.01); *D06P 3/523* (2013.01); *D06P 3/82* (2013.01); *D06P 3/8204* (2013.01); *D06P 3/8214* (2013.01); *D06P 5/2077* (2013.01)

(58) Field of Classification Search
CPC . C09B 7/02; D06P 1/228; D06P 3/523; D06P 3/82; D06P 3/8204; D06P 3/8214
See application file for complete search history.

(56) References Cited

U.S. PATENT DOCUMENTS

| | | |
|---|---|---|
| 5,243,052 A | 9/1993 | Taylor et al. |
| 8,523,957 B2 | 9/2013 | Arioglu et al. |

(Continued)

FOREIGN PATENT DOCUMENTS

| | | |
|---|---|---|
| EP | 0408269 | 1/1991 |
| EP | 0648817 | 4/1995 |

(Continued)

OTHER PUBLICATIONS

STIC Search Report dated Aug. 15, 2018.*
European Search Report of priority EP application 16195293.2 dated Mar. 30, 2017.
International Search report of corresponding PCT application No. PCT/EP2017/064508 dated Aug. 1, 2017.

(Continued)

*Primary Examiner* — Eisa B Elhilo
(74) *Attorney, Agent, or Firm* — Silvia Salvadori (57) ABSTRACT

The present invention relates to the use of indigo derivatives for dyeing synthetic textiles to a process for dyeing synthetic textiles and to dyed textiles and articles containing them. The invention also relates to novel indigo derivatives per se and to a process for the preparation thereof.

19 Claims, 4 Drawing Sheets

(51) Int. Cl.
*D06P 3/82* (2006.01)
*D06P 3/04* (2006.01)

(56) References Cited

U.S. PATENT DOCUMENTS

2001/0039358 A1* 11/2001 Hao .................. C09B 1/005
552/212
2002/0123005 A1   9/2002  Ichimura et al.
2004/0067537 A1   4/2004  Hahn et al.
2007/0033748 A1   2/2007  Arioglu et al.

FOREIGN PATENT DOCUMENTS

| EP | 1498541 | 1/2005 |
| EP | 1840172 | 10/2007 |
| JP | 7-150068 | 6/1995 |
| WO | 9314257 | 7/1993 |
| WO | 9832800 | 7/1998 |

OTHER PUBLICATIONS

European Search Report of priority EP application 16174973.4 dated Nov. 28, 2016.
Bora Yoon et al: Patterned Fluorescence Images with Indigo Precursors in Polymer film Bullettin of the Korean Chemical Society, Apr. 20, 2013.
Eric Daniel Glowacki et al "Patterned Fluorescence Images with Indigo Precursors in Polymer Film", Bulletin of the Korean Chemical Society, vol. 23 No. 4, Apr. 20, 2013.
Dominik Farka et al. "Reversible Photochemical Isomerization of N, N'-Di(t-butoxycarbonyl) indigos" Journal of Physical chemistry a., molecules, spectroscopy, kinetics, environment ad general theory, vol. 119, No. 15, Apr. 16, 2015.
Office Action from JPTO for corresponding JP patent application No. 2017-116627 dated Jul. 2, 2018.
Glowacki et al Reversible photochemical isomerization of N,N'-Di(t-butoxycarbonyl indigos), The Journal of phisical chemistry 2015.

* cited by examiner

Figure 3 di-*t*-Boc indigo $^{13}$C-NMR spectrum

Figure 4

USE OF INDIGO DERIVATIVES FOR DYEING SYNTHETIC TEXTILES, NOVEL INDIGO DERIVATIVES AND PROCESS FOR DYEING SYNTHETIC TEXTILES

RELATED APPLICATIONS

This application is related to, and claims priority to, European application EP 16174973.4, filed 17 Jun. 2016 and entitled "Use of Indigo-Derivatives as Irreversible Color Changeable Dyes for Textile Materials, Novel Compounds and a Process for Dyeing Textile Materials," and European application EP 16195293.2, filed 24 Oct. 2016 and entitled "Use of Indigo Derivatives for Dyeing Synthetic Textiles, Novel Indigo Derivatives and Process for Dyeing Synthetic Textiles", the contents of each of which are hereby incorporated by reference, as if set forth in their entireties.

TECHNICAL FIELD

The present invention relates to the use of indigo derivatives for dyeing synthetic textiles to a process for dyeing synthetic textiles and to dyed textiles and articles containing them. The invention also relates to novel indigo derivatives per se and to a process for the preparation thereof.

BACKGROUND

In common practice, synthetics yarns and fabrics made out of those yarns, such as polyesters and polyamides, are dyed with commercially available dispersed dyes at high temperatures, in jet dyeing machines.

Jet dyeing is a batch process, leading to the penetration of dye molecules deep into yarns and fabrics, because of the high pressure and temperature in a closed vessel. This deep penetration of the dye, makes this process not able to provide the "ring effect" to the yarns (or "surface dyeing" to the fabrics), which is a crucial feature for denim industry. As it is known, ring effect dyeing (i.e., perimeter dyeing), is defined as a dyeing that does not completely penetrate into the yarn (or into the fabric), but only on its surface, thus an external dyeing is achieved.

The currently available indigo dyeing process is continuous, but it can only be used for cotton and cotton rich yarns and fabrics and is not applicable to synthetic materials. This inconvenience is due to the fact that synthetic yarns and fabrics have hydrophobic surfaces, which make them difficult to be dyed with waterborne dyeing solutions such as, indeed, indigo dye solutions.

Thus, conventional indigo cannot be used as a dye for synthetic yarns and fabrics using the current infrastructure and technology.

Therefore, there is a need to find compounds and processes that allow to dye synthetic textiles showing a ring effect, using conventional continuous indigo dyeing industrial plants.

SUMMARY OF THE INVENTION

It is a scope of the invention to provide the use of indigo derivatives to dye synthetic textiles.

It is a further scope of the invention to provide a process to dye synthetic textiles with derivatives of indigo.

It is a further scope of the invention to provide novel products, which are N-protected indigo dyed synthetic textiles possessing the "ring effect" and colour changing capability upon heating, and an article made by said textiles.

It is a further scope of the invention to provide synthetic textiles which colour may be also changed upon heating by an intermediate user and/or by the end user.

It is a further scope of the invention to provide novel indigo derivatives, which are able to dye synthetic textiles, and a process for the preparation thereof.

DETAILED DESCRIPTION

According to one of its aspect, the present invention provides the use of indigo derivatives of Formula (I)

wherein:
R1 and R2 are, each independently, selected from hydrogen and a sterically hindered, hydrophobic protecting group, and may be selected from t-Boc, Fmoc, benzyl carbamate, triphenylmethylamine, benzylamine and trifluoroacetamide; provided that R1 and R2 are not both hydrogen;
R3 and R4 are, each independently, selected from hydrogen, alkyl, such as methyl, alkoxy such as methoxy, halogen, $NO_2$, CHO and optionally substituted phenyl;
as dyes for synthetic textiles.

Some of the above compounds of formula (I) are disclosed and claimed in the above co-pending European patent applications in the name of the present Applicant. The expression "synthetic textiles" herein refers to any synthetic material suitable to prepare fabrics, and includes yarns, fabrics, ready for dyeing fabrics and textile articles, such as for instance garment articles. The expression "ready for dyeing fabrics" means a fabric which has undergone the desizing, mercerization and washing steps.

According to the invention, synthetic textiles include, but are not limited to, a polyamide (PA), such as polyamide 6 (PA 6), polyamide 66 (PA 66), polyamide 612 (PA 612), polyamide 12 (PA 12); a polyester (PES) such as polyethylene terephthalate (PET), polybutylene terephthalate (PBT), polyethylene furanoate (PEF); and any mixtures thereof. Most preferred synthetic textiles are based on PET, PEF, PA6, and PA66 yarns and their blends and/or mixtures thereof.

The expression "sterically hindered, hydrophobic protecting group" is self-explaining and indicates a protecting group which is able to improve the hydrophobicity of the compound of formula (I).

The expression "t-Boc group" or "t-Boc" herein indicates a tert-Butyloxycarbonyl group.

The expression "Fmoc group" or "Fmoc" herein indicates a Fluorenylmethyloxycarbonyl group.

The expression "halogen" or "halo" herein indicates a Cl, Br, F or I atom. Useful halogens are Cl and Br, Br being particularly useful.

"Alkyl" and "alkoxy" herein indicate linear or branched, saturated or unsaturated $C_{1-4}$ alkyl or alkoxy groups, such as advantageous methyl and methoxy groups.

If both R1 and R2 are a protecting group, then they may be the same protecting group in advantageous embodiments.

Embodiments of desirable protecting groups according to the invention are t-Boc and Fmoc, most preferably t-Boc.

R3 and R4 may be hydrogen or halogen atoms. R3 and R4 may be selected from hydrogen, bromine and chlorine.

In an advantageous embodiment of the invention, compounds of formula (I) are mono or di t-Boc protected indigo derivatives, wherein R3 and/or R4 are bromine or hydrogen atoms.

When R3 and/or R4 are substituted phenyl, they can be selected from one or more methyl, methoxy halogen, $NO_2$ and CHO.

In various embodiments of the invention, advantageous compounds are mono or di t-Boc protected indigo derivatives, wherein R3 and/or R4 are bromine or hydrogen. As mentioned above, synthetic textiles are hydrophobic, this makes them difficult to be dyed with the conventional indigo dyes. Indeed, leuco-indigo dyes are hydrophilic compounds, they can only be used in waterborne dyeing solutions.

It was now surprisingly found that an appropriate hydrophilic/hydrophobic balance in leuco-indigo (reduced indigo) derivatives makes it possible to dye synthetic textiles showing a ring effect using indigo dyes, while using conventional continuous indigo dyeing industrial plants.

It was in fact found that indigo derivatives bearing one or two hydrophobic groups lead to an increase in their hydrophobic behaviour. This can be achieved, according to the invention, by protecting the nitrogen present in the indigo ring with a hindered hydrophobic protecting group, such as t-Boc or Fmoc, said group being susceptible to be easily removed, if desired.

In order to obtain the optimal hydrophilic/hydrophobic balance, as it will be described in the dyeing process below, the carbonyl groups of the indigo derivatives are reduced and salified, such as according to the process disclosed in the U.S. Pat. No. 8,523,957, in the name of the present Applicant and the contents of which are herein incorporated by reference as if set forth in their entirety.

It was unexpectedly observed that the N-protection and the salification result in a proper hydrophilic/hydrophobic balance, which enables the indigo derivatives of the invention to have an affinity for hydrophobic synthetic textile surfaces. This allows the compounds of Formula (I) to be used as dyes for synthetic textiles, also achieving the desired ring effect.

According to one of its aspect, the present invention also provides for a process for dyeing synthetic textiles with the indigo derivatives of Formula (I), achieving the ring effect, which comprises:

a) preparing a dye bath, which comprises a dyeing solution comprising the at least a partially salified, reduced form of at least one N-protected indigo derivative of Formula (I), and b) dyeing a synthetic textile, using single or multiple dye tanks, thus obtaining a synthetic textile surface-dyed with the indigo derivatives of Formula (I).

In step (a), the dyeing solution is prepared by reacting the protected indigo derivatives of Formula (I) with reducing agents, caustic soda and the conventional auxiliary chemicals, such as wetting agents, cation-complexing agents (e.g., EDTA), etc., such as according to U.S. Pat. No. 8,523,957. The reducing agents reduce the carbonyl groups of the indigo derivatives, converting them into hydroxyl groups, while caustic soda allows the salt formation of the freshly generated hydroxyl groups.

In various embodiments, the reducing agents may be sodium dithionite or sodium sulphite. Wetting agent, cation chelating agent may also be advantageously used as auxiliary chemicals.

The dyeing solution comprising at least one N-protected indigo derivatives of Formula (I) or reduced derivatives thereof or at least partially salified reduced derivatives thereof, represents another subject-matter of the invention.

In step (b), the dyeing of synthetic textiles is performed by dipping and skying said textiles in one or more dye tanks. The dipping is may be carried out in multiple stages, such as with dipping intervals that last for 1-30 seconds, 2-20 seconds, and advantageously about 15-18 seconds.

The skying intervals that last 50-250 seconds or 80-100 seconds, or advantageously about 90 seconds.

The dye application and the subsequent skying sequence may be advantageously repeated multiple times, for instance at least two times, or 4 to 8 times, in order to increase dye loading.

The dyeing temperature is generally comprised between 20° C. and 90° C., or between 35-45° C., advantageously 25 to 30° C.

Of course, lighter or darker shades of the synthetic textiles may be achievable, depending on the dye concentration in the bath in step (a) and the number of dye tanks used in step (b).

The color of the synthetic textiles obtained after step (b) is magenta, as the color of indigo dye is shifted from blue to magenta upon the N-protection.

If the synthetic textiles are subjected to a further step c), which is a step of thermal treatment of the textiles, the labile protecting groups attached to indigo are removed. As said before, the color of the indigo dye is shifted from blue to magenta upon the de-protection of N-protection groups; therefore, two terminal colors magenta and blue can be obtained by controlled thermal treatment temperature and time. Of course, if all the protecting groups are cleaved, blue indigo color is obtained.

The thermal treatment may be performed for instance in an oven at a temperature from 100 to 120° C., advantageously from 110 to 130° C., for instance at about 120° C. for 10 to 200 minutes, advantageously from 40 to 100 minutes, for instance for about 90 minutes, depending on the desired color to be obtained. Requested colors may also be achievable in short time intervals at higher temperatures than 150° C.

The thermal treatment for changing the color of the textiles may be performed either by the manufacturer or by an intermediate and/or by the end user; the thermal treatment may be carried out on a garment including the dyed fabric of the invention. The thermal treatment may be carried out on a part of the fabric or of the garment, e.g. by heating only a portion of the garment/fabric with suitable heating means.

So, the synthetic textiles obtained according to the invention allow, i.a., the end user to act on them in order to reach the desired color. This is an original solution which gives the end user the possibility to change the color of the textile article bought as desired. Thus, for instance, a magenta colored textile article may be used for a period of time, and then the user may change the color of said article, as herein disclosed.

Another possibility provided by the invention is that a first company may manufacture a synthetic fabric and sell it to an intermediate handling company, which will be able to processing it and obtain, for instance, garments or any other final textile article, of any desired color from magenta to blue.

Conventional physical and chemical treatments of the textiles thus obtained, well known to the skilled in the art, can be performed, if desired.

Chemical and physical treatments include, but are not limited to, rinse wash, stone wash, enzyme wash, abrading with sand paper, oxidizing with potassium permanganate ($KMnO_4$), bleaching with sodium hypochlorite NaClO, etc.

It is therefore clear from the above description that the process of the invention, which uses the indigo derivatives of formula (I), may be carried out in conventional indigo dyeing industrial plants, allowing to dye synthetic textiles using a continuous open tank system, instead of costly batch processes presently needed for dyeing synthetic textiles.

Moreover, this process of the invention allows the indigo dyeing of synthetic textiles, also obtaining a ring effect, which is a very important and desired feature.

According to one of its aspect, the present invention also provides for an N-protected indigo dyed synthetic textile material showing the ring effect and colour changing capability upon heating.

According to one of its aspect, the present invention also provides for articles, such as a garment article, made by or comprising the synthetic textile of the invention. Said articles include, but are not limited to, sportswear, pants, skirts, shirts, hats and jackets, and the like.

According to another of its aspect, the present invention also provides for the compounds of Formula (I')

wherein:
R1' and R2' are, each independently, selected from hydrogen, a t-Boc and a Fmoc group, provided that R1' and R2' are not both hydrogen;
R3' and R4' are, each independently, selected from hydrogen, alkyl such as methyl, alkoxy such as methoxy, halogen, NO2, CHO, and optionally substituted phenyl,
provided that, when
one of R1' and R2' is t-Boc and the other one is hydrogen, or
both R1' and R2' are both t-Boc,
then R3' and R4' are neither hydrogen nor halogen atoms;

and provided that, when
both R1' and R2' are both Fmoc,
then R3' and R4' are not both hydrogen atoms.

N-protected indigo derivatives of formula (I') are useful for dyeing synthetic textiles with the conventional indigo dyeing infrastructure, allowing at the same time the "ring effect" and colour changing capabilities upon heating to said textiles.

The use of at least one compound of Formula (I') for dyeing synthetic textiles according to the description above represents another aspect of the present invention.

According to one of its aspect, the present invention also provides for a process for dyeing synthetic textiles according to the description above, which comprises the use of at least one compound of Formula (I').

Compounds of Formula (I) and (I') may be prepared according to conventional methods.

For instance, the synthesis of the compounds of the invention may be carried out by stirring the corresponding non-protected indigo derivatives in an organic solvent, such as dichloromethane ($CH_2Cl_2$), at room temperature with two equivalents of a compound suitable to introduce the desired protecting group, such as di-tert-butyl dicarbonate (t-$BOC_2O$), if R1, R1', R2 and R2' are t-Boc groups, and about one equivalent of a base, such as an N,N'-dimethylaminopyridine (DMAP). The reaction is completed in 1-3 days (the reaction may be monitored for instance by thin layer chromatography). To work-up different alternative ways can be used. For instance, the reaction mixture may be concentrated almost to dryness and filtrated, for example on the 80-fold amount of silica gel with toluene/ethyl acetate (9:1) to give the products in yields up to 90%. For their analysis, the samples may be recrystallized from a suitable solvent, such as ethyl acetate. As an alternative, the reaction solvent is removed under pressure at low temperature, then water is added onto the solid form is stirred, for instance for 60 minutes, and filtrated, such as with a sintered disc filter funnel. Then HCl is added, for instance HCl 2M, and the mixture is stirred. The mixture may be stirred overnight and afterwards, it is filtrated, such as with a sintered disc filter funnel and rewashed with 1M NaOH and again filtered with sintered disc filter funnel and dried, preferably at a temperature below 60° C.

Other possible reaction conditions and work-up may however be carried out, according to the methods known to the skilled in the art.

The compounds of formula (I) or (I') wherein one of R1, R1', R2 and R2' is a hydrogen atom and the other is a protecting group, can be synthesized by using only one equivalent of the compound suitable to introduce the desired protecting group.

The synthesis of representative compounds of the invention is disclosed in the Experimental Section herein below.

The process for preparing the compounds of Formula (I') represent another subject-matter of the invention.

EXPERIMENTAL SECTION

Example 1

General Preparation of Compounds of Formula (I) when R1 and R2 are t-Boc

The preparation of the compounds of the title is carried out according to the scheme below. Compounds A are stirred in dichloromethane ($CH_2Cl_2$), at room temperature with 4 eq. of di-tert-butyl dicarbonate (t$BOC_2O$) and 2 eq. of N,N'-dimethylamino pyridine (DMAP) for 1-3 days (the reaction monitored by thin layer chromatography) to obtain compounds B. The solvent evaporated with rotary evaporator at room temperature, then water added and the mixture is stirred for additional 30 minutes. The mixture is filtered through sintered disc filter funnel. Afterwards, the filtrate acidified with 2M HCl and stirred overnight. Finally, the solution is filtered with a sintered disc filter funnel and dried at a temperature below 60° C.

B

Example 2

General Preparation of Compounds of Formula (I) when R1 and R2 are Fmoc

The preparation of the compounds of the title is carried out according to the scheme below.

An indigo solution (1.5 g, 5.7 mmol) in DMAc (30 mL) was prepared and sodium hydride (0.27 g, 11.2 mmol) was added for deprotonation. Then the reaction mixture was cooled to 0° C. and kept stirred under a $N_2$ atmosphere. 9-Fluorenylmethyl chloroformate (Fmoc-Cl, 3.0 g, 11.5 mmol) solution in DMAc (30 mL) was added dropwise, and the mixture was stirred for additional 6 hours. The mixture was extracted with ethyl acetate for three times and then water for three times. Collected organic layers were dried over $MgSO_4$. A purification was carried out with column chromatography (chloroform/hexane=10/1 and then chloroform/ethyl acetate=10/1) followed by recrystallization (from chloroform/hexane) to give essentially pure C.

A

C

Example 3

Dyeing Process and Thermal Treatment

The dyeing process is carried out by preparing water-based indigo derivative dyeing solutions using conventional reducing agents and two different concentrations of N-protected indigo derivatives of Formula (I). As the synthetic textile, a fabric of a polyester (PES) yarns is used. Pad-batch equipment is used. The dyeing process consists of one dipping and skying stages, lasting 3 seconds and 90 seconds respectively at room temperature. Pad-batch process parameters were 2 bar squeezing pressure and 2 m/min. speed. Squeezing is followed by drying in a stenter machine at 120° C. for 2 minutes.

Figure 1A:
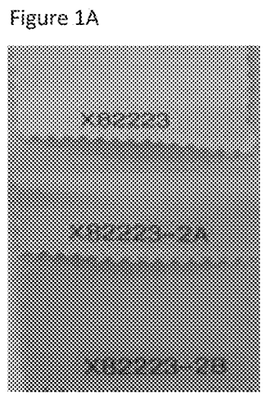
FIGS. 1A-1D show two synthetic textile materials dyed with the indigo derivatives of the invention, before and after thermal treatment.
Figure 1B:
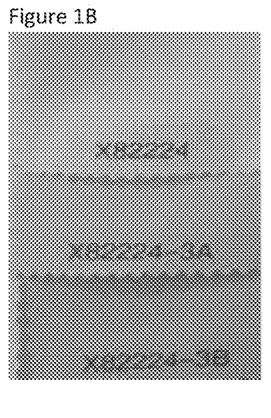

The starting PES textiles and the same textiles after the dyeing process above, before and after thermal treatment, are shown in FIGS. 1A to 1D. FIGS. 1A and 1B show the starting textiles, identified with reference numbers X82223 and X82224; the same textiles after the dyeing process with a dyeing solution containing 1.6 g/L of dye are identified as X82223-2A and X82224-3A, and after a dyeing process with a dyeing solution containing 3.2 g/L of dye are identified with reference numbers X82223-2B and X82224-3B). The dye was a compound of formula (I) wherein R1 and R2 are both a t-Boc group and R3 and R4 are both hydrogen.

Figure 1C:
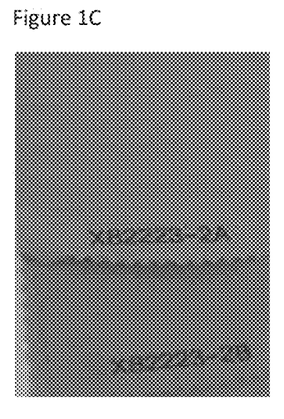
Figure 1D:
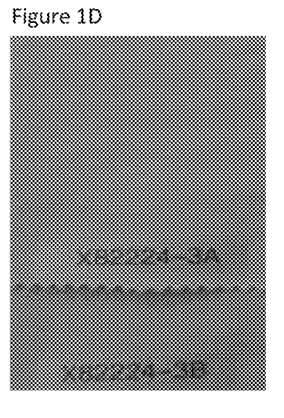
Figure 2:
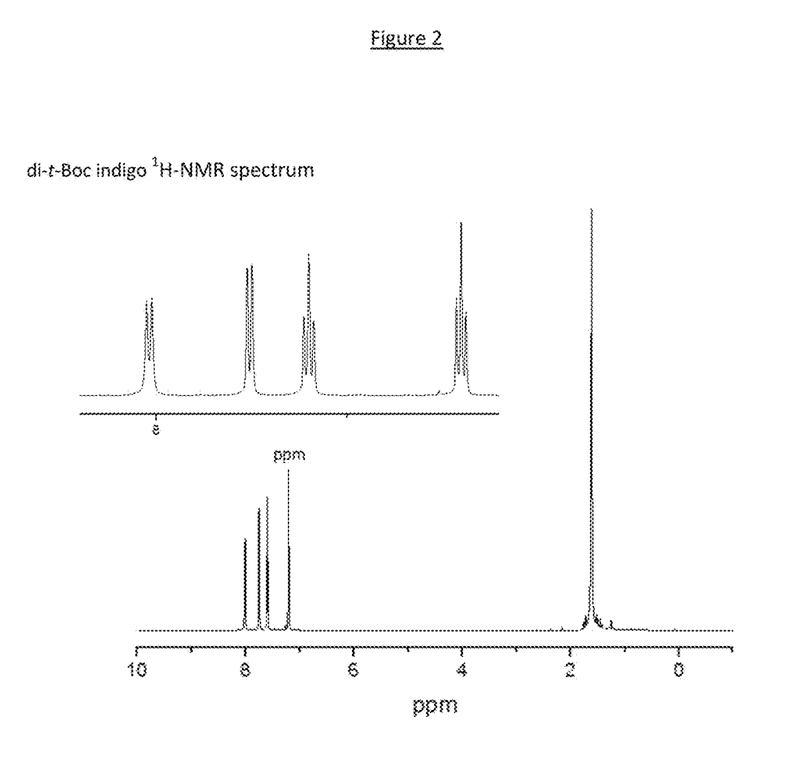
FIG. 2 shows the $^1$H-NMR spectrum of the compound of Formula (I) wherein R1 and R2 are both t-Boc and R3 and R4 are both H.
Figure 3:
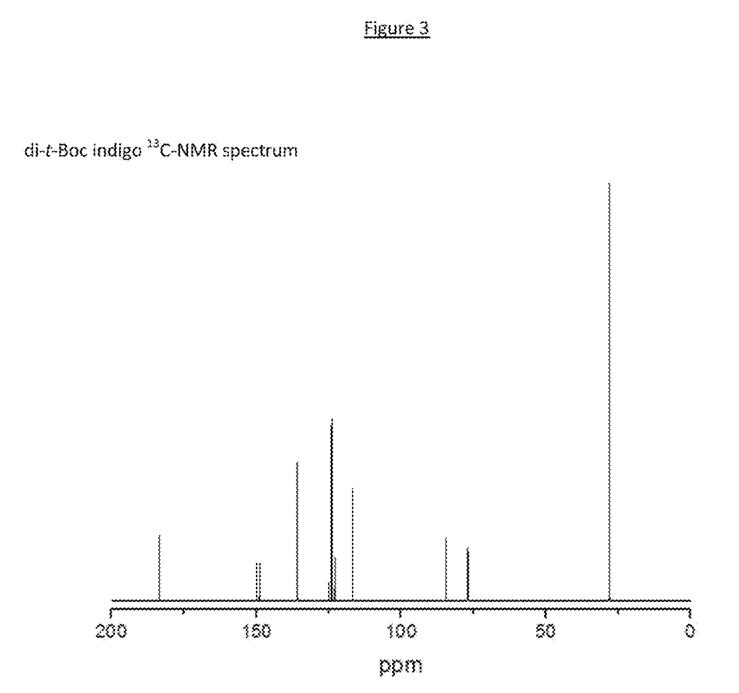
FIG. 3 shows the $^{13}$C-NMR spectrum of the compound of Formula (I) wherein R1 and R2 are both t-Boc and R3 and R4 are both H.
Figure 4:
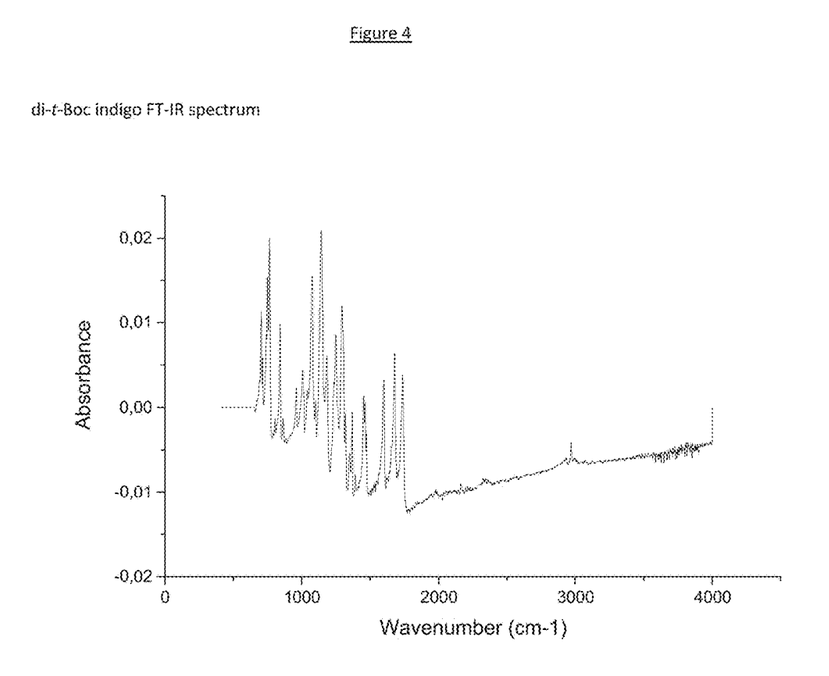
FIG. 4 shows the FT-IR spectrum of the compound of Formula (I) wherein R1 and R2 are both t-Boc and R3 and R4 are both H.

FIGS. 1C and 1D show the same textiles after thermal treatment at 120° C. for 60 minutes in a heating oven. The colours of the reference material and of the samples obtained were classified with the Pantone Colour Matching System. Table 1 shows Pantone Colour Numbers corresponding to the textiles of FIGS. 1A to 1D.

TABLE 1

| Fabric | | Pantone Colour Number | | |
|---|---|---|---|---|
| | | | t-BOC Indigo dyed fabric | | Thermally treated fabric |
| X82223/Reference | FIG. 1A | 11-0601 | FIG. 1C | — |
| X82223-2A | | 7431 C | | 5415 C |
| X82223-2B | | 702 C | | 5405 C |
| X82224/Reference | FIG. 1B | 11-0601 | FIG. 1D | — |
| X82224-3A | | 7431 C | | 5415 C |
| X82224-3B | | 702 C | | 7699 C |

It is possible to notice the difference in shades of the two dyed synthetic textiles, dyed with two different dying solution concentrations as well as the dramatic change of colour after the thermal treatment.

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes and to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Although the invention has been described in terms of various embodiments, it is not limited thereto. Rather, the appended claims should be construed broadly, to include other variants and embodiments of the invention, which may be made by those skilled in the art without departing from the scope and range of equivalents of the invention.

The invention claimed is:

1. A method for dyeing synthetic textiles which comprises the use of indigo derivatives of Formula (I)

(I)

wherein:
R1 and R2 are, each independently, selected from hydrogen, a tert-butoxycarbonyl (t-Boc) and a fluorenylmethyloxycarbonyl (Fmoc) group, provided that R1 and R2 are not both hydrogen;
R3 and R4 are, each independently, selected from hydrogen, $C_{1-4}$ alkyl, $C_{1-4}$ alkoxy, halogen, $NO_2$, CHO, and substituted phenyl, provided that R3 and R4 are not both hydrogen.

2. The method, according to claim 1, wherein said synthetic textiles are selected from polyamide 6 (PA6), polyamide 66 (PA66), polyamide 612 (PA612), polyamide 12 (PA12), polyethylene terephthalate (PET), polybutylene terephthalate (PBT) and any mixtures thereof.

3. The method, according to claim 1, wherein both R1 and/or R2 are a tBoc or a Fmoc group.

4. The method, according to claim 1, wherein said $C_{1-4}$ alkyl is methyl and said $C_{1-4}$ alkoxy is methoxy.

5. The method, according to claim 1, wherein
at least one of R1 and R2 is t-Boc and
R3' and R4' are both a halogen atom.

6. The method, according to claim 2, wherein both R1 and R2 are both a t-Boc group or are both a Fmoc group.

7. The method, according to claim 2, wherein said $C_{1-4}$ alkyl is methyl and said $C_{1-4}$ alkoxy is methoxy.

8. The method, according to claim 2, wherein
at least one of R1 and R2 is t-Boc and
R3' and R4' are both a halogen atom.

9. A process for dyeing synthetic textiles achieving the ring effect, by using the indigo derivatives of Formula (I)

wherein:
R1 and R2 are, each independently, selected from hydrogen, a t-Boc and a Fmoc group, provided that R1 and R2 are not both hydrogen;
R3 and R4 are, each independently, selected from hydrogen, $C_{1-4}$ alkyl, $C_{1-4}$ alkoxy, halogen, $NO_2$, CHO, and substituted phenyl;
which comprises:
a) preparing a dye bath, which comprises a dyeing solution comprising at least a partially salified, reduced form of at least one N-protected indigo derivative of Formula (I) as defined in claim 1, and
b) dyeing a synthetic textile, using single or multiple dye tanks, thus obtaining a synthetic textile surface-dyed with said indigo derivatives of Formula (I).

10. The process according to claim 9, further comprising the step of:
c) thermally treating at least part of the fabric obtained from step b) so as to change its colour in the absence of a further dye or of a colour modifying agent.

11. An indigo dyed synthetic textile material showing a ring effect and colour changing capability upon thermal treatment as obtainable by a process according to claim 9.

12. An indigo dyed synthetic textile material showing a ring effect and colour changing capability upon thermal treatment as obtainable by a process according to claim 10.

13. An article comprising the textile material according to claim 11.

14. An article comprising the textile material according to claim 12.

15. The article according to claim 13, the colour of which can be changed by an intermediate user and/or by the end user by thermal treatment.

16. The article according to claim 14, the colour of which can be changed by an intermediate user and/or by the end user by thermal treatment.

17. A compound of formula (I')

(I')

wherein:
R1' and R2' are, each independently, selected from hydrogen, a t-Boc and a Fmoc group, provided that R1' and R2' are not both hydrogen;

R3' and R4' are, each independently, selected from hydrogen, $C_{1-4}$ alkyl, $C_{1-4}$ alkoxy, halogen, $NO_2$, CHO, and phenyl, provided that
- when at least one of R1' and R2' is t-Boc and the other one is hydrogen, or both R1' and R2' are t-Boc,
- then R3' and R4' are neither hydrogen nor halogen atoms;

and provided that, when
- both R1' and R2' are both Fmoc,
- then R3' and R4' are not both hydrogen atoms.

18. The compound according to claim 17, wherein R1' and R2' are both a t-Boc or a Fmoc group.

19. The compound according to claim 17, which is selected from mono- and di-t-Boc indigo derivatives.

* * * * *